United States Patent [19]

Giddings et al.

[11] Patent Number: 4,476,275

[45] Date of Patent: Oct. 9, 1984

[54] METAL DODECYLBENZENESULFONATES AS PROCESSING AIDS FOR POLYCARBONATES

[75] Inventors: Brandford E. Giddings, Shaker Heights; Richard J. Jorkasky, II, Maple Heights, both of Ohio

[73] Assignee: The Standard Oil Company, Cleveland, Ohio

[21] Appl. No.: 457,041

[22] Filed: Jan. 10, 1983

[51] Int. Cl.³ ............................................ C08G 63/62
[52] U.S. Cl. .................................. 525/462; 524/161; 528/487; 528/488
[58] Field of Search ............... 525/462; 528/487, 488; 524/161

[56] References Cited

U.S. PATENT DOCUMENTS

| | | | |
|---|---|---|---|
| 3,269,971 | 8/1966 | Goldblum | 260/31.4 |
| 3,919,167 | 11/1975 | Mark | 260/45.8 N |
| 4,075,164 | 2/1978 | Mark | 260/45.7 S |
| 4,092,291 | 5/1978 | Mark | 525/462 |
| 4,214,062 | 7/1980 | Binsack et al. | 525/462 |
| 4,220,583 | 9/1980 | Mark | 260/45.7 S |
| 4,231,920 | 11/1980 | Mark et al. | 260/45.7 S |
| 4,252,916 | 2/1981 | Mark | 525/151 |
| 4,263,201 | 4/1981 | Mark et al. | 260/45.7 |

OTHER PUBLICATIONS

"Plasticizers," Kirk–Othmer Encyclopedia of Chemical Technology, vol. 18, 3rd Ed., 111–177, (J. Wiley & Sons, Inc., 1982).
Chemical Abstracts 83:194495X, Yonemitsu et al., "Heat-Stable Polycarbonate Blends with Rubber-Modified Thermoplastics".
"Lexan," Modern Plastics Encyclopedia 1980–1981, vol. 57, No. 10A, 17–19, (McGraw-Hill, Inc., 1980).

Primary Examiner—Harold D. Anderson
Attorney, Agent, or Firm—Maky, Renner, Otto & Boisselle

[57] ABSTRACT

A process for improving the processability of polycarbonates by contacting a polycarbonate composition with a metal salt of dodecylbenzenesulfonic acid in an amount sufficient to decrease the melt viscosity of the polycarbonate composition while increasing the impact strength.

18 Claims, No Drawings

METAL DODECYLBENZENESULFONATES AS PROCESSING AIDS FOR POLYCARBONATES

BACKGROUND OF THE INVENTION

This invention relates to a process for improving the properties of polycarbonate compositions by addition of a property improving amount of a metal dodecylbenzenesulfonate. In particular, the invention relates to improving the processability by lowering the melt viscosity of polycarbonate compositions while also maintaining or improving impact strength.

Polycarbonates are resins in which groups of dihydric or polyhydric phenols are linked through carbonate groups. Generally, these resins can be formed from any dihydroxy compound in any carbonate diester, or by ester exchange. Polycarbonate resins are characterized by the —OCOO— hetero chain unit. A common general purpose polycarbonate may be formed by reaction of bisphenol A with phosgene to produce:

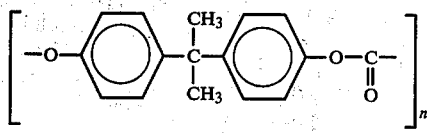

There are many commercial sources of polycarbonate compositions including Dow Chemical Company, Mobay Chemical Corporation, Rohm & Haas Company, etc. Polycarbonates have many sought after properties such as high impact strength, good electrical properties, dimensional stability, rigidity, etc. Plus, polycarbonate compositions have been widely applied in such diverse applications as housewares, medical equipment, automotive applications, construction, plumbing, lighting components, furniture, business machines, food containers, etc. See, e.g., "Polycarbonate," *Modern Plastics Encyclopedia* 1981-1982, Vol. 58, No. 10A, 46 and 527-528 (McGraw Hill, Inc., 1981).

Although polycarbonate compositions have many desirable physical properties for which they are widely used; polycarbonates are difficult to process due to a high melt viscosity. Materials which have a high melt viscosity necessitate the use of higher processing temperatures and thereby increase energy costs of processing relative to the processing of similar materials having lower melt viscosity.

Therefore, plasticizers are usually incorporated into a material. Plasticizers increase a material's workability, flexibility, or distensibility. The addition of a plasticizer may lower the melt viscosity, the second order transition temperature or the elastic modulus of a plastic. Plasticizers may sometimes be utilized as processing aids to lower the processing temperature without altering the usefulness of the final product. See generally, "Plasticizers," Kirk-Othmer Encyclopedia of Chemical Technology, Vol. 18, 3rd Ed., 111-177 (J. Wiley & Sons, Inc., 1982).

A typical polycarbonate such as that synthesized from bisphenol A, is characterized by a high hot-melt viscosity, which makes fabrication difficult. It is known that incorporation of about 0.2-5 weight percent of a suitable plasticizer, e.g., an aliphatic carbonate, can aid fabrication.

Polycarbonate compositions are compatible with a wide variety of plasticizers, including alkyl aryl hydrocarbons, adipates, benzoates, cyanamides, glycolates, phosphates, phthalates, pyromellitates, aryl sebacates, and sulfonamides. Most of these are compatible up to 100 phr (parts per hundred parts of resin) or higher. At high plasticizer concentrations and at elevated temperatures, the resin molecules are mobile enough to crystallize in the plasticizer exudes. Crystallinity can be avoided by quench-cooling. Little broadening of the elastomeric range is observed with most plasticizers. Generally the material behaves as a plasticized amorphous resin. Plasticizers with moderately high polarity usually provide the best results. It is also known that polycarbonate is unusually subject to antiplasticization by some plasticizers, e.g., BBP and Santicizer 8. See "Plasticizers," supra, at 160.

Disadvantageously, some desirable physical properties can be impaired by the use of these known processing aids in conjunction with polycarbonate compositions. In particular, addition of processing aids which lower melt viscosity can also detrimentally lessen the impact strength of the modified polycarbonate compositions.

SUMMARY OF THE INVENTION

According to the present invention the processability of polycarbonate compositions is improved by contacting a polycarbonate composition with a metal dodecylbenzenesulfonate (metal DBS) in an amount sufficient to decrease the melt viscosity of the polycarbonate compositions without a substantial loss of impact strength.

Surprisingly, when a preferred amount of the metal salt is added to polycarbonate resins not only does the resin flowability increase (due to a decrease in melt viscosity), but there is also an increase in the impact strength of the modified compositions. These advantageous improvements in polycarbonate properties are obtained without significant loss in other desirable physical properties of polycarbonates.

DETAILED DESCRIPTION OF THE INVENTION

The process of the present invention is useful in modifying the behavior of polycarbonate compositions. Polycarbonate compositions are well known polymers having a multitude of uses due to their excellent physical properties. A typical polycarbonate resin is transparent and has great impact strength. Also, as noted above, polycarbonate resins are characterized by the —OCOO— hetero-chain unit. Suitable materials for application of the invention include any polycarbonate, but especially those whose processability is improved by a lower melt viscosity. Suitable polymers may be derived from two or more different dihydric phenols or a copolymer of a dihydric phenol with a glycol or with a hydroxy or acid terminated polyester or with a dibasic acid in the event that a carbonate copolymer or interpolymer is desired.

Also, suitable polycarbonate resin compositions may be produced by: phosgenation of dihydric phenols, usually bisphenol A; ester exchange between diaryl carbonates and dihydric phenols, usually between diphenyl carbonate and bisphenol A; and interfacial polycondensation of bisphenol A and phosgene. Advantageously bisphenol A polycarbonates are utilized. Preferred are polycarbonates having medium to high viscosity e.g. Lexan ®141 sold by the General Electric Company of Pittsfield, Mass.

Although unmodified polycarbonate resins have many desirable properties, typically the polymer melt will be highly viscous requiring elevated temperatures for processing. In this regard, processing aids have been used to improve the flowability of the resin, and some degree of success has been achieved. Unfortunately, many of these aids tend to degrade or evaporate at the temperatures necessary to process polycarbonate. In many cases, too, the presence of the additives tends to affect other important resin properties. For example, impact strength can be drastically reduced.

The process of the present invention utilizing the specified metal dodecylbenzenesulfonates as processing aids ameliorates the foregoing disadvantages by modifying polycarbonate compositions so that the melt viscosity is reduced without significant loss in other physical properties. Also, the impact strength of the modified compositions may actually be improved. Thus, when the process of the invention is used polycarbonate compositions so modified may be shaped e.g. by injection molding to provide useful articles of manufacture. Generally, the modified polycarbonate compositions are heated, shaped, and then allowed to cool thereby maintaining the shape given during heating. Since these compositions are modified by metal dodecylbenzenesulfonates a lower temperature may be used in shaping the compositions without loss of other desirable physical properties.

A further advantage of the present invention is that the metal component of the dodecylbenzenesulfonate can be chosen to make the processing aid either soluble or insoluble in a variety of solvents including water. Therefore some processing aids may optionally be removed from the processed resin by washing in a suitable solvent. In many applications, however, it will be desirable that the processing aid be maintained in the resin and for these situations a suitable metal moiety may be chosen according to the process of the invention that is insoluble in particular solvents such as water.

A still further advantage of the present invention is that the processing aid can be added to a polycarbonate resin precursor such as bisphenol A and plasticization of the carbonate may be accomplished by in situ polymerization with a processing aid. Thus, the precursor/processing aid combination can be polymerized to form a polycarbonate composition having the disclosed beneficial properties of the present invention. Generally, polymerization of carbonate compounds to form polycarbonate compositions may be beneficially conducted in the presence of metal dodecylbenzenesulfonates to provide resins which have increased flowability due to lower melt viscosity without substantially impairing other desirable physical properties.

Although it may be desirable to remove the processing aid from the processed resin for certain applications, it does not appear to be necessary and the resin/processing aid combination appears to be quite stable.

Generally the processing aid utilized by the present invention is a metal dodecylbenzenesulfonate which acts as a plasticizer. For a plasticizer to be effective with any polymeric material, the plasticizer and polymeric material should be intimately mixed. This is typically accomplished by mixing or heating until one dissolves in the other or by dissolving in a solvent.

The processing aid utilized by the present inventive process is a metal dodecylbenzenesulfonate. Sodium dodecylbenzenesulfonate ($C_{12}H_{25}C_6H_4SO_3Na$) has a dodecyl radical which may have many isomers. Also, the benzene may be attached to the dodecyl radical in many positions. Sodium dodecylbenzenesulfonate (NaDBS) is widely used as a synthetic detergent and readily available from commercial producers. Typically it is derived by alkylating benzene with dodecene. The resulting dodecylbenzene, which usually is a mixture of isomers, is sulfonated with sulfuric acid and neutralized with caustic soda. The sodium cation is generally associated with the sulfonate moiety. Other metal dodecylbenzenesulfonates may conveniently be formed by treatment of the sodium DBS with a suitable metal chloride, e.g. $MgCl_2$, $CaCl_2$, etc.

In the present invention it has been found that metal salts of dodecylbenzenesulfonic acid (metal dodecylbenzenesulfonates) when admixed with polycarbonate provide highly processable blends which exhibit improved notched Izod, without a substantial loss in other desired physical properties. Since the additives are metal salts, they are capable of withstanding high processing temperatures without suffering thermal degradation. Advantageously, the alkaline metal salts of dodecylbenzenesulfonic acid are water-insoluble, and are thus not extractable by typical aqueous solutions. Suitable salts of DBS include metals, especially mono and divalent metals of the periodic table. For example, Group I and Group II metals of the periodic table such as that found on the inside cover of *CRC Handbook of Chemistry and Physics*, 54th Ed. (CRC Press, 1973). Advantageously, insoluble metals such as the alkaline earth metals may be utilized. Beneficially sodium, magnesium, calcium, and zinc may be employed. An amount of metal DBS that is effective in lowering the melt viscosity of polycarbonate compositions without substantial loss of other physical properties is required. Preferably the amount chosen should also be sufficient to increase the impact strength of the polycarbonate compositions to which it is applied. A suitable range of metal DBS has been found to be equal to X where $0 < X \leq 20$ weight percent of the combined metal DBS and polycarbonate are present. Beneficially X may be chosen so that $1 \leq X \leq 8$ weight percent of the combined metal DBS and polycarbonate present. Amounts of metal DBS in excess of 20 weight percent tend to decrease the melt viscosity so much that processability is actually impaired. Of course actual amounts used will depend upon other process parameters such as the particular polycarbonate and metal DBS utilized. Generally, between 1 and 8 weight percent of metal DBS in addition to lowering the melt viscosity will provide a dramatic increase in the impact strength as measured by the notched Izod. It is within the skill of the art to optimize the proper amount of metal DBS to be added to a particular amount of resin or polycarbonate resin precursor. This optimization may be done without undue experimentation. Actual amounts or ratios used will depend upon practical considerations such as the particular processing parameters chosen including, but not limited to, the particular resin or precursor and modifying components used as well as the particular processes in which these materials are to be modified.

Preferably the processing aids of the present invention should be thoroughly mixed with the resin or resin precursor. Following are examples and counter-examples given to illustrate the process of the invention. In all the following examples, unless otherwise indicated, the polycarbonate used is Lexan ®Polycarbonate Resin 141 available from the General Electric Company. All blending is conducted in a Brabender Plasti-Corder set at about 35 rpm and at a temperature of about 240° C. A predetermined amount of polycarbonate is weighed and enough processing aid is added to bring the combined weight to about 50 gms. The processing aids are mixed and the homogenized mixture is added to the Brabender and masticated for about 15 minutes. Samples are removed every three minutes and the Brabender torque recorded. The 12 minute torque reading is chosen to represent the processability of the material. The 15 minute masticated sample is used to obtain physical properties including melt flow and impact strength. Compression molded bars are prepared from the masticated material. ASTM refers to the American Society for Testing and Materials and all ASTM tests referred to are standard methods which are hereby incorporated by reference.

EXAMPLE 1 (CONTROL—NOT OF THE INVENTION)

An approximately 50 gm. sample of polycarbonate resin is masticated at 240° C. in a Brabender Plasti-Corder as a control material. After 12 minutes the torque is determined to be 2100 meter grams. About 3 minutes later (approximately 15 total minutes of mastication) the masticated material is removed from the Brabender and evaluated. The evaluated material is determined to have a melt flow index of about 0.25 gm. per 10 minutes. The melt flow index is the amount, in grams, of a resin which can be forced through an orifice of 0.0825 inch diameter when subjected to a force of 2160 gms. in 10 minutes at 190° C. The test is performed by an extrusion rheometer described in ASTM D1238. The masticated material is also used to form compression molded bars which are used to measure impact strength by the notched Izod test according to ASTM D256. The average (two or more tests) notched Izod is 2.22 ft. lbs. per inch.

EXAMPLE 2

Example 1 is repeated but using approximately 47.5 gms. of polycarbonate and 2.5 gms. sodium dodecylbenzenesulfonate (NaDBS). Now the measured torque at 12 minutes is about 680 meter grams for a 67.6% improvement relative to the control (Example 1). Also the melt flow is 2.23 gms. per 10 minutes and the notched Izod is 12.25 ft. lbs. per inch.

In Example 2 the process of the invention is utilized. Addition of about 5% by weight of NaDBS improves the processability, decreases the melt viscosity and increases the impact strength as shown by a decrease in torque, increase in melt flow and increase in the average notched Izod.

EXAMPLE 3

Example 2 is repeated but using 45 gms. polycarbonate and 5 gms. NaDBS. The Brabender torque reading after 12 minutes is about 220 meter grams for an 89.5% improvement over the control (Example 1). The melt flow index is 2.22 per 10 minutes and the average notched Izod is 9.15 ft. lbs. per inch.

In Example 3, the processability has continued to improve as shown by the decrease in torque, however, the melt flow is about the same as in Example 2 and the impact strength is less than Example 2, but still over four times higher than the control.

EXAMPLES 4–12

Examples 4–12 (Examples 4 and 8 are controls—not of the invention) are performed as above and the results and any parameter changes are presented in Table I. In Examples 4–7 an additional parameter, a glass transition temperature, $T_g$, is determined.

TABLE I

| | Processability of Polycarbonate with Sodium Dodecylbenzenesulfonate(DBS) | | | | | | |
|---|---|---|---|---|---|---|---|
| Ex. No. | Polycarbonate Percentage | % NaDBS | Torque (mg) | Improvement Percentage | Melt Flow Index (g/10 min) | Notched Izod (ft.lbs/in) | $T_g$ °C. |
| 4 | 100 | — | 1480 | — | 0.73 | 1.32 | 142 |
| 5 | 99 | 1 | 1020 | 31.1* | 1.06 | >11.13 | 142 |
| 6 | 95 | 5 | 560 | 62.2* | 1.70 | >10.20 | 145 |
| 7 | 90 | 10 | 220 | 85.1* | 6.56 | >7.93 | 1.45 |
| 8 | 100 | — | 1360 | — | 0.85 | 1.41 | — |
| 9 | 99 | 1 | 960 | 29.4** | 1.24 | 1.74 | — |
| 10 | 98 | 2 | 740 | 45.6** | — | 8.80 | — |
| 11 | 95 | 5 | 540 | 60.3** | 1.53 | >10.37 | — |
| 12 | 90 | 10 | 240 | 82.4** | 6.94 | >7.09 | — |

*Relative to Example 4
**Relative to Example 8

EXAMPLES 13–16

Examples 13–16 (Example 13 is a control—not of the invention) are performed as above and the following properties are evaluated: Heat distortion temperature (HDT) according to ASTM D648; flexural strength (FS) according to ASTM D790; flexural modulus (FM) according to ASTM D790; notched Izod according to ASTM D256; and tensile strength (TS) according to ASTM D638. The results for various polycarbonate compositions are given in Table II.

TABLE II

| | Physical Properties of Polycarbonate with Sodium Dodecylbenzenesulfonate(DBS) | | | | | | |
|---|---|---|---|---|---|---|---|
| Ex. No. | Polycarbonate Percentage | % NaDBS | HDT° C. | FS × $10^3$ psi | FM × $10^5$ psi | Notched Izod (ft.lbs/in) | TS × $10^3$ psi |
| 13 | 100 | — | 135 | 14.30 | 3.07 | 1.41 | 10.0 |
| 14 | 99 | 1 | 134 | 13.50 | 2.88 | 1.74 | — |
| 15 | 95 | 5 | 130 | 12.60 | 3.17 | >10.37 | 9.58 |
| 16 | 90 | 10 | 131 | 9.90 | 2.38 | >7.09 | 7.83 |

It is seen by Table II that addition of amounts of metal DBS sufficient to decrease the melt viscosity of polycarbonate compositions and/or increase the impact strength as measured by the notched Izod test do not substantially impair other useful properties of polycarbonate compositions.

By use of the phrases "without a significant loss in physical properties" or "without substantial loss of impact strength" the meaning intended is that the polycarbonate so modified by addition of a metal DBS as a processing aid may be usefully employed relative to the unmodified polycarbonate. One skilled in the art is readily able to determine whether or not the process employed is that of the invention.

EXAMPLES 17-21

Examples 17-21 (17 is a control—not of the invention) are performed as above for various metal salts of dodecylbenzene sulfonate (DBS). The results are shown in Table III.

such as magnesium and calcium demonstrate reduced Brabender torque and increase impact strength as does zinc.

EXAMPLES 22-29 (NOT OF THE INVENTION)

Counter-examples 22-29 were conducted as above for various amounts of dodecylbenzene. The results are presented in Tables IV and V.

TABLE IV

| | Processability of Polycarbonate with Dodecylbenzene(DB) | | | | | |
|---|---|---|---|---|---|---|
| Ex. No. | Polycarbonate Percentage | % DB | Torque(mg) | Improvement Percentage | Melt Flow Index (g/10 min) | Tg° C. |
| 22 | 100 | — | 1540 | — | 0.70 | 138 |
| 23 | 99 | 1 | 940 | 39.0* | 0.98 | 137 |
| 24 | 95 | 5 | 480 | 68.8* | 3.24 | 107 |
| 25 | 90 | 10 | 180 | 88.3* | 5.82 | 80 |

*Relative to Ex. 22

TABLE V

| | Physical Properties of Polycarbonate and Dodecylbenzene(DB) | | | | | | |
|---|---|---|---|---|---|---|---|
| Ex. No. | Polycarbonate Percentage | % DB | HDT° C. | FS × $10^3$ psi | FM × $10^5$ psi | Notched Izod (ft.lbs/in) | TS × $10^3$ psi |
| 26 | 100 | — | 134 | 13.90 | 3.19 | 1.14 | 10.50 |
| 27 | 99 | 1 | 124 | 14.80 | 3.28 | 1.07 | 10.00 |
| 28 | 95 | 5 | 98 | 17.00 | 3.76 | 0.75 | 10.90 |
| 29 | 90 | 10 | 73 | 14.70 | 3.38 | 0.66 | 9.13 |

Counter-examples 22-25 of Table IV show that processability of polycarbonates improve with the addition of dodecylbenzene. However, as Table V shows, the physical properties are affected. Note especially that the impact strength as measured by the notched Izod test decreases undesirably.

EXAMPLES 30-47 (NOT OF THE INVENTION)

TABLE III

| | Processability of Polycarbonate and Various Metal Salts of DBS | | | | | |
|---|---|---|---|---|---|---|
| Ex. No. | Polycarbonate Percentage | % Metal DBS | Metal | Torque(mg) | Improvement Percentage | Notched Izod (ft.lbs/in) |
| 17 | 100 | — | — | 820 | — | 1.61 |
| 18 | 95 | 5 | Mg | 320 | 61.0* | 8.37 |
| 19 | 95 | 5 | Mg | 300 | 63.4* | 8.88 |
| 20 | 95 | 5 | Ca | 300 | 63.4* | 8.18 |
| 21 | 95 | 5 | Zn | 300 | 63.4* | 8.00 |

*Relative to Ex. 17

Table III shows that other metal dodecylbenzenesulfonates besides NaDBS work according to the process of the invention. In particular, alkaline earth metals Counter-examples 30-47 are conducted as above for various amounts of various metal toluene sulfonates (MBS). The results are shown in Tables VI and VII.

TABLE VI

| | Processability of Polycarbonate with Metal Toluenesulfonate(MBS) | | | | | | |
|---|---|---|---|---|---|---|---|
| Ex. No. | Polycarbonate Percentage | % Metal MBS | Metal | Torque(mg) | Improvement Percentage | Melt Flow Index (grams/10 min) | Tg° C. |
| 30 | 100 | — | — | 3450 | — | 0.17 | 146 |
| 31 | 99 | 1 | Na | 2700 | 21.7* | No flow | 148 |
| 32 | 99 | 1 | Mg | 3650 | — | 0.19 | 148 |
| 33 | 99 | 1 | Zn | 2700 | 21.7* | 0.23 | 141 |
| 34 | 95 | 5 | Zn | 1540 | 55.4* | No flow | — |
| 35 | 90 | 10 | Zn | 1340 | 61.2* | No flow | — |
| 36 | 100 | — | — | 2400 | — | 12.34 | — |
| 37 | 95 | 5 | Na | 900 | 62.5* | Very fast | — |
| 38 | 95 | 5 | Mg | 750 | 68.8** | 111.38 | — |

*Relative to Ex. 30
**Relative to Ex. 36

TABLE VII
Physical Properties of Polycarbonate and Metal Toluenesulfonates (MBS)

| Ex. No. | Polycarbonate Percentage | % Metal MBS | Metal | HDT° C. | FS × 10³ (psi) | FM × 10⁵ (psi) | Notched Izod (ft.lbs/in) | TS × 10³ (psi) |
|---|---|---|---|---|---|---|---|---|
| 39 | 100 | — | — | 140 | 17.00 | 3.61 | 1.75 | 11.10 |
| 40 | 99 | 1 | Na | | | Not Moldable | | |
| 41 | 95 | 5 | Na | | | Not Moldable | | |
| 42 | 99 | 1 | Mg | 139 | 14.40 | 3.34 | 2.43 | 10.80 |
| 43 | 99 | 1 | Zn | 135 | 9.89 | 4.01 | 1.31 | 11.40 |
| 44 | 95 | 5 | Zn | 128 | 2.79 | 4.07 | 0.54 | — |
| 45 | 90 | 10 | Zn | | | Not Moldable | | |
| 46 | 100 | — | — | 138 | 16.10 | 3.34 | 6.97 | 10.50 |
| 47 | 95 | 5 | Mg | 133 | 15.70 | 3.78 | 1.33 | 9.52 |

As seen from Tables VI and VII, metal toluene sulfonates (MBS) in contrast to the metal dodecylbenzenesulfonates do not have the desired ameliorative effect. In particular, comparison of Examples 30, 31; 36, 37; and 40,41 shows that sodium toluenesulfonate (MBS) while improving processability is not moldable due to brittleness. Also, comparison of magnesium MBS as shown in Examples 30, 32; 36, 38; 39, 42; and 46, 47 demonstrates that while addition of a small amount (about 1%) will improve impact strength, it also decreases processability. At higher levels (about 5%) processability is improved, but impact strength is below that of the control. A comparison of the zinc MBS compositions by Examples 30, 33, 34, 35; and 39, 43, 44, 45 demonstrates that all show a decrease in impact strength.

As mentioned above, the above examples serve only to illustrate the invention and its advantages, and they should not be interpreted as limiting since further modifications of the disclosed invention will be apparent to those skilled in the art. All such modifications are deemed to be within the scope of the invention as defined by the following claims.

What is claimed is:

1. A process for improving the processability of polycarbonates consisting essentially of contacting a polycarbonate with a metal salt of dodecylbenzenesulfonic acid in an amount sufficient to decrease the melt viscosity of the polycarbonate without a substantial loss in impact strength.

2. A process as defined in claim 1 wherein said metal salt is water-insoluble.

3. A process as defined in claim 1 wherein said impact strength increases.

4. A process as described in claim 1 wherein said metal salt is present in an amount, x, where $0 < x \leq 20$ weight percent of the combined metal salt and polycarbonate composition.

5. A process as described in claim 1 wherein said metal salt is present in an amount from about 1 to about 8 weight percent of the combined metal salt and polycarbonate composition.

6. A process as defined in claim 1 wherein said metal salt is a mono- or divalent metal.

7. A process as described in claim 1 wherein said metal is an alkaline earth metal.

8. A process as described in claim 1 wherein said metal is an alkali metal.

9. A process as described in claim 1 wherein said metal is sodium, magnesium, calcium, or zinc.

10. A process as described in claim 1 wherein said metal is zinc.

11. A process as described in claim 1 wherein said metal is sodium.

12. A process as described in claim 1 wherein said metal is magnesium.

13. A process as described in claim 1 wherein said metal is calcium.

14. A process as described in claim 4 wherein said metal is an alkaline earth metal.

15. A process as described in claim 3 wherein said metal salt is present in an amount, x where $0 < x \leq 20$ weight percent of the combined metal salt and polycarbonate composition.

16. A process for modifying polycarbonates by lowering melt viscosity while increasing impact strength consisting essentially of mixing a polycarbonate with a metal dodecylbenzenesulfonate.

17. A process for reducing melt viscosity in polycarbonates consisting essentially of mixing a polycarbonate with an insoluble metal salt of dodecylbenzenesulfonic acid.

18. A process for shaping polycarbonates consisting essentially of heating a polycarbonate containing a metal salt of dodecylbenzenesulfonic acid, shaping said polycarbonate and allowing said shaped polycarbonate to cool.

* * * * *